Figure 1:
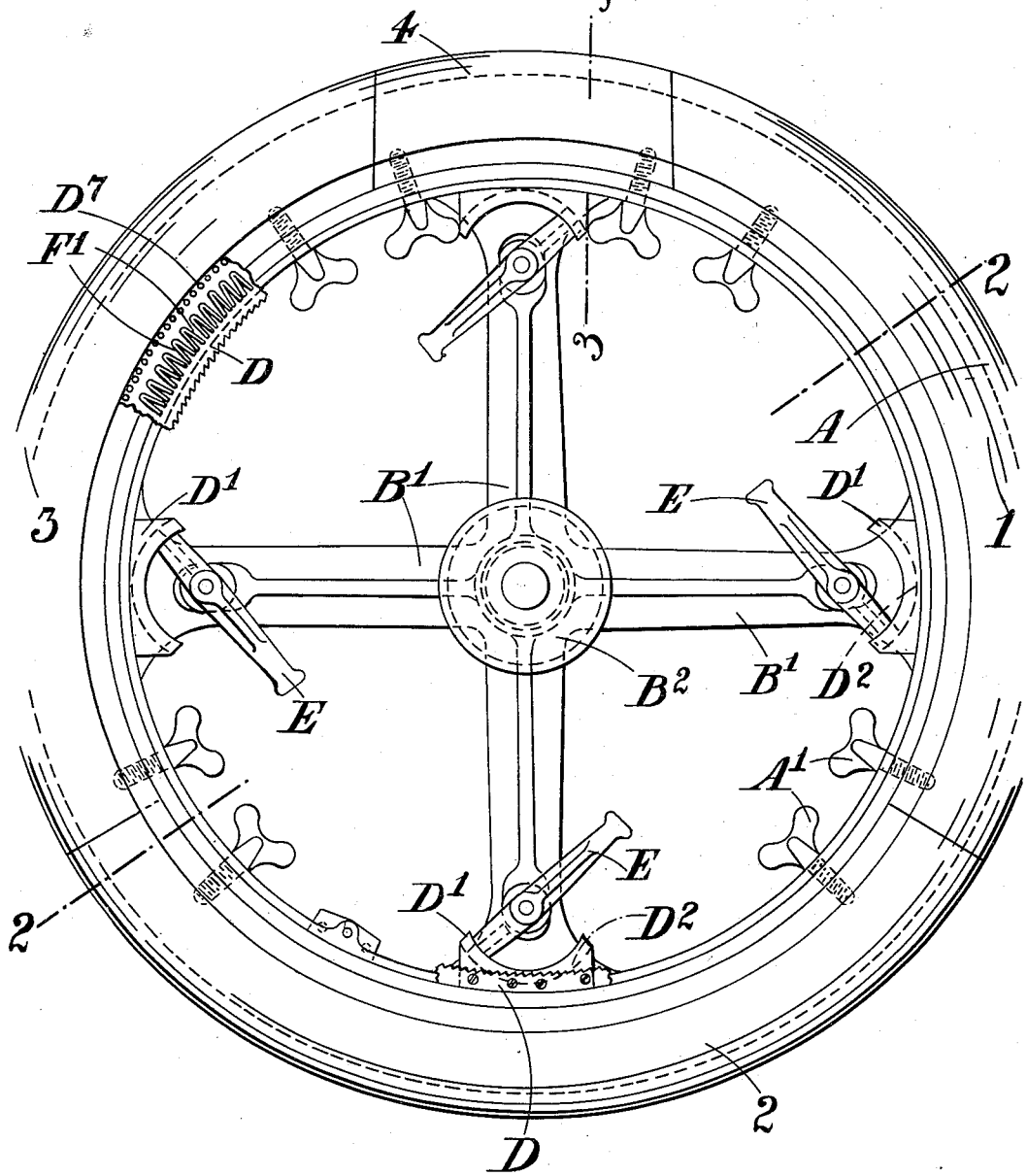

No. 880,587. PATENTED MAR. 3, 1908.
T. SLOPER.
APPARATUS FOR MANUFACTURING PNEUMATIC TIRES.
APPLICATION FILED JUNE 27, 1907.

4 SHEETS—SHEET 1.

No. 880,587. PATENTED MAR. 3, 1908.
T. SLOPER.
APPARATUS FOR MANUFACTURING PNEUMATIC TIRES.
APPLICATION FILED JUNE 27, 1907.
4 SHEETS—SHEET 3.
Fig. 3.
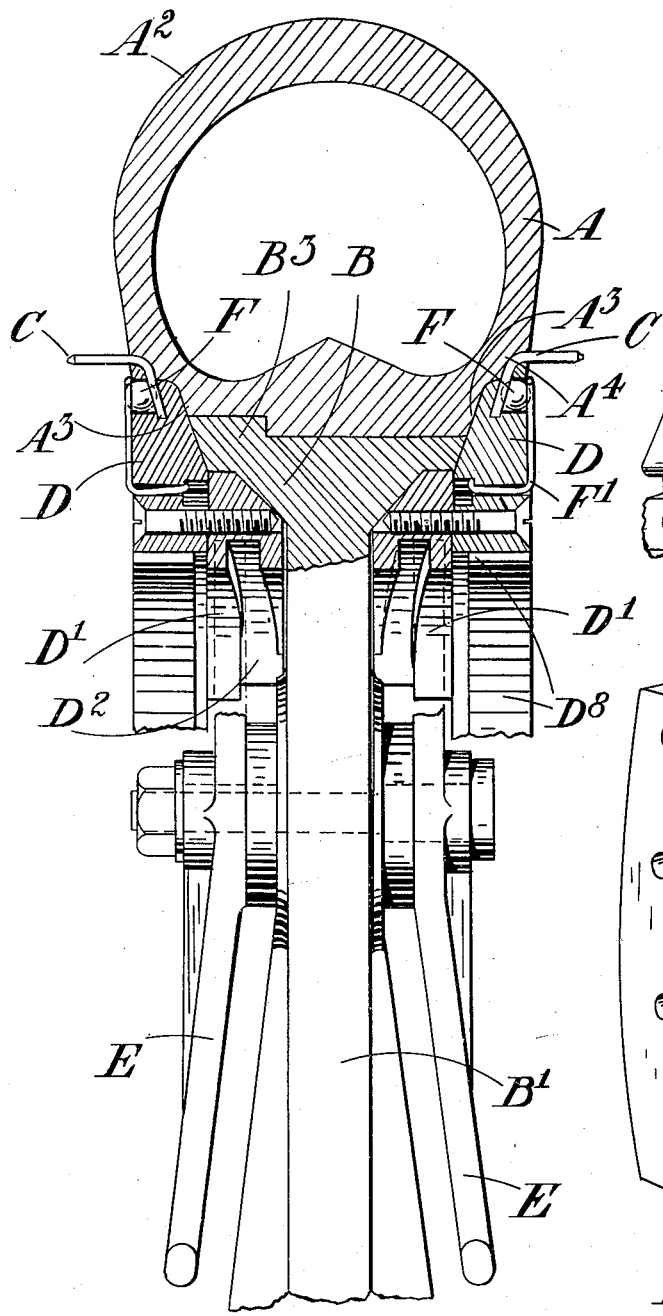
Fig. 4.
Fig. 5.
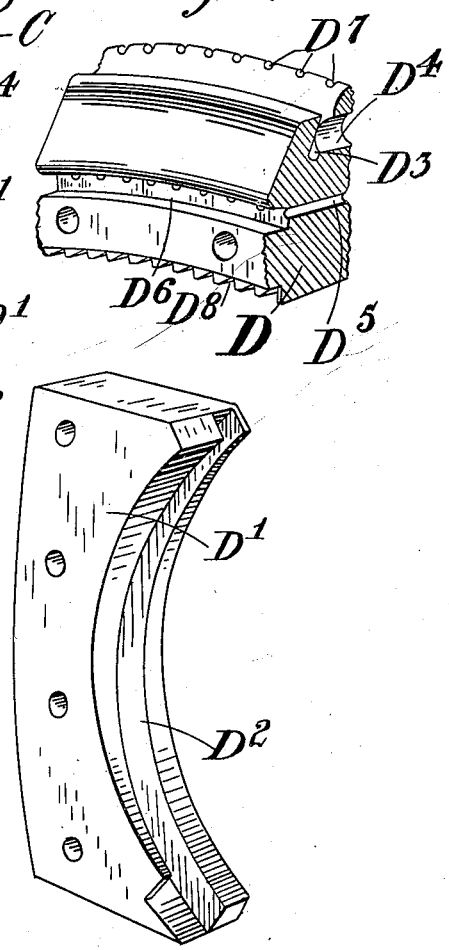
Inventor
Thomas Sloper,
By Knight Bros No. 880,587. PATENTED MAR. 3, 1908.
T. SLOPER.
APPARATUS FOR MANUFACTURING PNEUMATIC TIRES.
APPLICATION FILED JUNE 27, 1907.
4 SHEETS—SHEET 4.
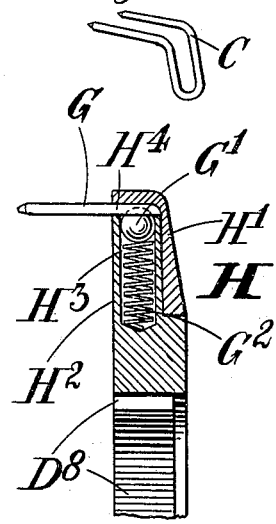
Fig. 6.
Fig. 7.
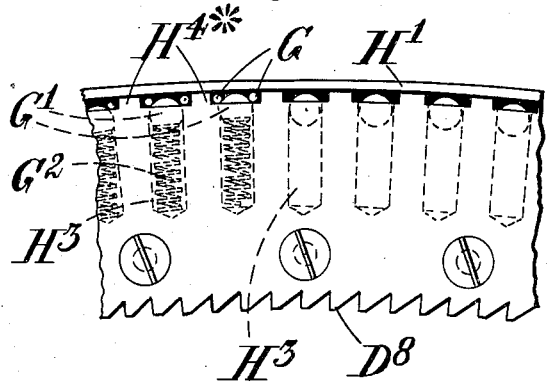
Fig. 8.
Fig. 9.
Witnesses
J. M. Wynkoop,
L. R. Levitt.
Inventor
Thomas Sloper,
By Knight Bros
Attys.

UNITED STATES PATENT OFFICE.

THOMAS SLOPER, OF DEVIZES, ENGLAND.

APPARATUS FOR MANUFACTURING PNEUMATIC TIRES.

No. 880,587.   Specification of Letters Patent.   Patented March 3, 1908.

Application filed June 27, 1907. Serial No. 381,164.

*To all whom it may concern:*

Be it known that I, THOMAS SLOPER, a subject of the King of England, residing at Devizes, England, have invented certain new and useful Improvements in Apparatus for Manufacturing Pneumatic Tires, of which the following is a specification.

This invention relates to mechanism for manufacturing tires and has for its object to provide an improved construction of "former" whereon the tires may be built up. These "formers" as at present constructed comprise a collapsible annular member having a curved working face whereon the tire is built; when the "formers" are employed for building pneumatic tires of the Palmer type a series of pins is provided on each side of the "former" and around these the cord or thread of which the tires are built is passed. A "former" of this type is described in an earlier patent specification No. 781687 granted to Christian Hamilton Gray and myself, and the present invention is an improvement of the same. In the old type of "former" the annular member was carried by two spokes or arms rigidly secured to it and these carried a central bearing, but according to this invention the annular member is used in combination with a central detachable wheel-like member or core whereby the sections whereof the annulus is composed are retained in the working position while such central member may be removed axially for the purpose of collapsing the annular member.

A further feature of this invention consists in combining with the annular member, (which may be collapsible as in the constructions already referred to) one or more detachable side-rings and these carry pins around which the tire fabric is built up. The annular member is preferably divided into several independent sections and these may be secured to the central core by winged bolts or the like while the side-rings are preferably secured in place by levers pivoted to the core and adapted to engage cam-pieces carried on the rings, so that the rings may be held against axial displacement.

In the old style of "former" when the fabric was completed the pins were withdrawn from the same into the interior of the "former" but according to the present invention, these pins are so mounted in the "former" that when the tire fabric is completed they can be released from the "former" and the fabric removed with the pins therein. This is of great advantage as the Palmer tires referred to are provided with pins in their edges for the purpose of anchoring the cords, of which the fabric is built up, to the bead and by means of the present construction of "former" the pins which are employed in building the fabric are afterwards used to anchor the cords in the finished tire.

The preferred means employed to retain the pins in place, consists in providing an annular slot or groove in each side-ring and also a series of orifices which communicate therewith so that one end of each pin can be entered in the slot while a spring-controlled plunger is mounted in a corresponding orifice and made to bear against the pin for the purpose of retaining it in position. The pins are thus held by friction in the "former" so that when it is required to remove them from the same they need only to be pulled forward out of the slot.

Preferably the collapsible annular member is recessed to receive each ring and one face of the recess is made to overhang the slot wherein the pins are entered in the ring. By this means the annular member may be made to lock the pins in position while the ring is in place but when the latter is moved axially or laterally out of the recess they can be withdrawn as already stated.

In the accompanying drawings: Figure 1 is a side elevation of a "former" constructed according to this invention, Fig. 2 is a transverse section on the line 2—2 of Fig. 1 with the side-rings and their levers detached, Fig. 3 is a section through Fig. 1 on the line 3—3 but on a larger scale, Fig. 4 is a perspective view of part of one of the side-rings, Fig. 5 is a perspective view of one of the cam-pieces with which the side-rings are provided, Fig. 6 is a perspective view of one of the double-pins or staples employed, Fig. 7 is a transverse section through a modified form of side-ring, Fig. 8 is a front elevation of the same, and Fig. 9 shows in perspective the form of double pin or staple employed with the ring shown in Fig. 7.

Like letters indicate like parts throughout the drawings.

Figure 2:
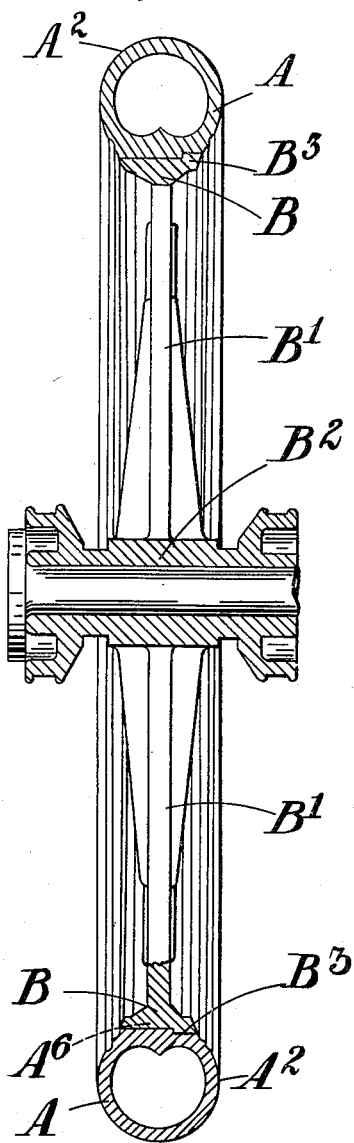

The collapsible annular member A may be of metal such as aluminium and is for convenience made hollow as shown in Figs. 2 and 3. This member comprises four independent sections marked, 1, 2, 3 and 4 respectively, and the sections are retained in place by a central wheel-like member or core B having spokes B¹ and a hub B². The periphery of the core B is made to fit within the annular member A and on one edge is a flange or rib B³ which fits in a corresponding recess in the annular member and limits the relative axial movement of the two parts in one direction. The independent sections of the annular member can thus be readily placed in position on the core where they are secured by winged bolts A¹ which pass through the rim of the core and enter screw-threaded sockets in the annular member.

The outer face A² of the annular member is shaped approximately to the form it is desired the tire shall assume when it is finished and this part constitutes the working face of the "former," that is the face whereon the cords or threads of the tire fabric are laid. At each edge of the working face of the "former" is a series of pins C and these are carried by detachable side-rings D. Each of the side-rings is endless and is shaped to fit in a recess A³ in the side of the "former." The side-rings are thus centered by the recesses A³ which receive them and they are retained against axial displacement by levers E pivoted to the spokes B¹ of the core and engaging cam-pieces D¹ rigidly secured to the rings D. Each ring preferably carries four cam-pieces, and each cam-piece comprises a block D¹ having in its face a cam slot or groove D². The rings are made to bed against the recessed portions of the annular member and also against the sides of the central core so that when the levers are entered in the cam-grooves D² and moved towards those ends of the grooves which lie furthest from the core, the rings are forcibly drawn against the annular member and core and thereby retained against axial displacement.

Each ring has in its edge an annular slot or groove D³ and communicating with this are a number of transverse orifices D⁴. The orifices D⁴ extend from the outer face of the ring to the groove D³ and in each orifice a plunger, in the form of a ball F is placed. Each ball is retained in place by an L-shaped spring F¹, one end of which is carried in an orifice or orifices D⁵ in the ring while the other end bears against the ball. The springs are conveniently made of looped wire, the looped portion being made to bear against the ball while the free ends are inserted each in a separate orifice D⁵. The orifices D⁵ are disposed in a line parallel with the orifices D⁴ and communicate on the inner side of the ring with an annular recess D⁶. The ends of the springs F¹ enter the groove D⁶ and are turned up or burred so that the springs are retained in place while they may if required be readily removed from the ring.

The pins C are in the form of L-shaped loops or staples (see Fig. 6) and the looped portion of each pin is entered in the slot or groove D³ opposite one of the plungers F. As the loop is entered it forces the plunger back against the spring F¹ and as soon as the looped end has passed the plunger, the spring again advances the latter so that the staple or double pin is frictionally held in place. The free ends of the staples extend over the peripheral edge of the ring and this latter is notched as at D⁷ so that the two limbs of the staple may lie in corresponding notches whereby displacement in the circumferential direction of the ring is prevented. The staples are mounted in the rings before these are applied to the "former" and when the rings are applied, that portion of each staple which engages the ring lies under the overhanging face A⁴ of the annular member A whereby the staples are prevented from being withdrawn from the slots D³ apart from the fact that they are frictionally held therein by the plungers F.

It will be seen that the looped end of the staples bearing against the plunger renders the fastening more secure than would be the case if the plunger were made merely to bear against the limbs. The parts are now in position for constructing the tire-fabric by laying cords on the "former" and building them around the free ends of the pins C. This may be done by any convenient means and in the earlier specification Serial No. 331,415 granted to Robert Sloper and myself, a machine is described for this purpose. According to the mechanism described in this specification, the "former" is automatically rotated by escapement mechanism and where such mechanism is used, the teeth therefor may be provided on the rings D as shown at D⁸.

When the fabric has been built up, the levers E are swung about their pivots so that by means of the cams D¹ the rings D are forced axially or laterally out from the recess A³ of the annular member. The pins or staples C are thus carried clear of the annular member and can now be withdrawn from the groove D³ of each ring whereby the rings are detached from the fabric and can be removed. The winged bolts A¹ are now released and the core B B¹ is withdrawn laterally or axially from the collapsible annular member A. The section 4 of the annular member is then withdrawn by moving it towards the center of the member whereupon all sections are released and can be taken out from the fabric or cover which has been built thereon.

The staples instead of being L-shaped as shown in Fig. 6, are sometimes straight as shown at G, Fig. 9, and when the latter form is employed the ring-shaped members D are differently constructed as shown at H, Figs. 7 and 8. The ring H is composed of two parts, one part H¹ˣ being of L-shaped cross-section while the other part H² has in it a series of radially disposed pockets H³. Between the pockets are a series of radial projections or teeth H⁴* which are spaced apart a distance equal to the width of the staples G. The part H² of the ring lies within the part H¹ and one side of the latter extends over the peripheral edge of the part H² so that it closes in the spaces or recesses formed by the projections H⁴*. The recesses thus constitute a divided annular slot or groove H⁴ in the side face of the member H into which the looped ends of the staples G can be entered. A plunger in the form of a ball G¹, is mounted in each pocket H³ and also a spring G² is mounted therein to keep the plunger at that end of the pocket remote from the center of the "former". The staples G are entered opposite the plungers, so that one plunger engages each staple as before, but with this arrangement the annular member A does not assist in retaining the staples in position. The rings H may be suitably shaped to receive cam-pieces such as D¹ and the "formers" and core may be recessed to receive the rings so that the outer face of each ring lies approximately flush with the face of the annular member as will be readily understood.

Obviously the levers E may be made to carry cam-pieces if desired which may engage pins on the rings D. It will be understood that although the pins have been described as mounted in detachable side-rings these may, where convenient, be mounted direct in the annular member A. This particularly applies to the straight form of staple shown in Fig. 9 as the grooves H⁴ could be provided in the annular member and pockets corresponding to the pockets H³ could be made in the same on the inner side of the groove to receive the plungers and their controlling-springs. Whether L-shaped or other staples are employed the plungers may be dispensed with if desired and the springs shaped to bear direct upon the pins to hold them in place.

Although the annular member has been described as composed of independent sections, it will be understood that these may be hinged together if desired while the core B B¹ is still employed therewith, nor would this arrangement interfere with the use of the rings D therewith.

Manifestly the details of construction above described can be varied without departing from the spirit of the invention; one of these detail alterations would be to employ pins instead of staples and to appropriately vary the mechanism by which they are held during the winding process.

What I claim as my invention and desire to secure by Letters Patent is:—

1. In a "former" employed in building up a tire fabric, means for holding a plurality of anchoring devices for the fabric, in such a manner that they may be released from the "former" without disturbing their relation to the fabric, substantially as set forth.

2. In a "former" employed in building up a tire fabric and having an annular working face for the tire-fabric, means for securing to the "former" a plurality of anchoring devices for the fabric situated in proximity to the edges of the working face, in such a manner that they may be released from the "former" without disturbing their relation to the fabric, substantially as set forth.

3. In a "former" employed in building up a tire fabric the combination of, a member providing an annular working face for the tire fabric, a side-ring for such member carrying a plurality of anchoring devices for the fabric, and means for detachably securing the side ring to the member aforesaid, substantially as set forth.

4. In a "former" employed in building up a tire fabric the combination of, a member providing an annular working face for the tire fabric, a side-ring for such member, means for detachably securing the side-ring to the member, and means for securing a plurality of anchoring devices for the fabric to the side-ring, in such a manner that they may be released from the side-ring without disturbing their relation to the fabric, substantially as set forth.

5. In a "former" employed in building up a tire fabric the combination of, a member providing an annular working face for the tire fabric, a side-ring for such member, means for securing the side-ring to the member, means for moving the side-ring laterally or in an axial direction relatively to the working-face of the member, and means for securing a plurality of anchoring devices for the fabric to such side-ring, in such a manner that they may be released from the side-ring without disturbing their relation to the fabric, substantially as set forth.

6. In a "former" employed in building up a tire fabric the combination of, an annular member providing an annular working face for the tire fabric, side-rings for such member, means for securing the side-rings one at each side of the annular member, means for moving the side-rings laterally or in an axial direction relatively to the annular member, and means for securing a plurality of anchoring devices for the fabric to each of the side rings, in such a manner that they may be released from the side-rings without disturbing their relation to the fabric substantially as set forth.

7. In a "former" employed in building up a tire-fabric the combination of, a member providing an annular working face for the tire fabric, a side-ring secured to such member, a wedging device and a coöperating part therefor, one of these elements being carried by the ring and the other being operatively connected with the member aforesaid the wedging device being so arranged that when operated it forces the ring laterally or in the direction of the axis of the annular working face away from the "former", and means for securing a plurality of anchoring devices for the fabric to the side-ring, in such a manner that they may be released from the side-ring without disturbing their relation to the fabric, substantially as set forth.

8. In a "former" employed in building up a tire fabric the combination of, a main member providing an annular working face for the tire fabric, a side-ring, a double-acting cam-device and a coöperating part therefor one of these elements being carried by the ring and the other being connected with the main member the cam-device being so arranged that when relative movement between it and its coöperating part takes place in one direction the ring is moved laterally towards and held in place upon the main member but when such movement takes place in the reverse sense the ring is moved laterally away from the main member, and means for securing a plurality of anchoring devices for the fabric to the side-ring, in such a manner that they may be released from the side-ring without disturbing their relation to the fabric, substantially as set forth.

9. In a "former" employed in building up a tire fabric the combination of, a main member providing an annular working face for the tire fabric, a side-ring, a double-acting cam device and a coöperating part therefor, one of these elements being rigidly secured to the ring and the other being pivotally connected with the main member, the cam device being so arranged that when relative movement between it and its coöperating part takes place in one direction the ring is moved laterally towards and held in place upon the main member but when such movement takes place in the reverse sense the ring is moved laterally away from the main member, and means for securing a plurality of anchoring devices for the fabric to the side-ring, in such a manner that they may be released from the side-ring without disturbing their relation to the fabric, substantially as set forth.

10. The combination with, a "former" employed in building up a tire fabric of a plurality of friction gripping devices adapted to receive and hold frictionally in place a plurality of anchoring devices for the fabric, substantially as set forth.

11. The combination with, a "former" employed in building up a tire fabric of a plurality of spring-controlled detents coöperating with a fixed part of the "former" and adapted to receive and retain in place a plurality of anchoring devices between them and such fixed part, substantially as set forth.

12. The combination with, a "former" employed in building up a tire fabric of a plurality of spring-controlled detents coöperating with a fixed part of the "former" and adapted to engage between them and such fixed part a plurality of anchoring devices for the fabric, each device having in it a recess to receive the operative end of a detent, substantially as described.

13. The combination with, a "former" employed in building up a tire fabric of a plurality of spring-controlled detents coöperating with a fixed part of the "former" and adapted to receive a plurality of anchoring devices each of which has a looped end that can be entered beneath a detent and such fixed part so that the detent retains it in place, substantially as set forth.

14. The combination with, a "former" employed in building up a tire fabric and having in it a recess or slot into which the ends of a plurality of anchoring devices may be entered, of a plurality of spring-controlled detents disposed transversely to the slot and urged by their springs towards one wall of the same, and means to hold the anchoring devices against lateral displacement within the slot and to aline each device with a detent so that the latter retains it in place, substantially as set forth.

15. In a "former" employed in building up a tire fabric the combination of a main member providing an annular working face for the tire-fabric, a side-ring detachably secured to the main member and having in it a recess or slot into which the ends of a plurality of anchoring devices may be entered, a plurality of spring-controlled detents carried by the ring and disposed transversely to the slot and urged by their springs towards one wall of the same, and means to hold the anchoring devices against lateral displacement within the slot and to aline each device with a detent so that the latter retains it in place, substantially as set forth.

16. In a "former" employed in building up a tire fabric the combination of a main member providing an annular working face for the tire fabric, a side-ring detachably secured to the main member having a groove in its outer periphery, a plurality of spring-controlled detents mounted in orifices (D⁴) which traverse the side-ring from one of its side faces to the groove referred to, the detents being urged by their springs towards the opposed face of the groove and arranged each to engage one end of an L-shaped anchoring device (C), and means to prevent lateral displacement of the L-shaped anchoring devices substantially as set forth.

17. In a "former" employed in building up a tire fabric the combination of, a main member providing an annular working face for the tire fabric and recessed on one side, a side-ring adapted to lie within the aforesaid recess and having a groove in its outer periphery, a series of spring-controlled detents mounted in orifices ($D^4$) which traverse the side-ring from one of its side faces to the groove referred to, the detents being urged by their springs to the opposed face of the groove and arranged each to engage one end of an L-shaped anchoring device (C) those ends of the L-shaped anchoring devices which are not engaged by the detents being directed away from the main member so that they lie partly within the recess wherein the ring is received, and means to retain the anchoring devices against lateral displacement, substantially as set forth.

18. In a "former" employed in building up a tire fabric the combination of a main member providing an annular working face for the tire fabric, a side ring having a groove in its outer periphery, means for detachably securing the side-ring to the main member, a series of detents mounted in orifices ($D^4$) which traverse the side-ring from one of its side faces to the aforesaid groove therein, and an L-shaped spring ($F^1$) for each detent one element of which lies in an orifice in the ring while the other element bears against the outer end of the detent, the detents being arranged to engage a plurality of anchoring devices whose ends are entered in the groove of the ring, substantially as set forth.

19. In a "former" employed in building up a tire fabric the combination of, an annular member formed in sections and providing a working face for the tire fabric, a detachable core shaped to enter the annular member and retain the sections against movement towards the center of the member, and means for securing to the "former" a plurality of anchoring devices for the fabric, substantially as set forth.

In testimony whereof I have signed my name to this specification in the presence of two subscribing witnesses.

THOMAS SLOPER.

Witnesses:
H. D. JAMESON.
F. S. RAND.